US011979705B2

(12) United States Patent
Jia et al.

(10) Patent No.: US 11,979,705 B2
(45) Date of Patent: May 7, 2024

(54) BLUETOOTH EARPHONE ADAPTIVE AUDIO PLAYBACK SPEED

(71) Applicant: Google LLC, Mountain View, CA (US)

(72) Inventors: Yongkang Jia, Mountain View, CA (US); Jeffrey Kuramoto, Mountain View, CA (US)

(73) Assignee: Google LLC, Mountain View, CA (US)

( * ) Notice: Subject to any disclaimer, the term of this patent is extended or adjusted under 35 U.S.C. 154(b) by 392 days.

(21) Appl. No.: 17/421,192

(22) PCT Filed: Jul. 22, 2020

(86) PCT No.: PCT/US2020/043043
§ 371 (c)(1),
(2) Date: Jul. 7, 2021

(87) PCT Pub. No.: WO2022/019900
PCT Pub. Date: Jan. 27, 2022

(65) Prior Publication Data
US 2022/0201381 A1 Jun. 23, 2022

(51) Int. Cl.
*H04R 1/10* (2006.01)
*G06F 3/16* (2006.01)
*H04W 4/80* (2018.01)

(52) U.S. Cl.
CPC ........... *H04R 1/1041* (2013.01); *G06F 3/165* (2013.01); *H04W 4/80* (2018.02)

(58) Field of Classification Search
CPC ........ H04R 1/1041; G06F 3/165; H04W 4/80; H04N 21/4392; H04N 21/43637
See application file for complete search history.

(56) References Cited

U.S. PATENT DOCUMENTS 6,665,751 B1 * 12/2003 Chen ................ H04N 21/23406
365/194
8,729,375 B1 * 5/2014 Bacigalupo ............ G10H 1/344
84/615

(Continued)

FOREIGN PATENT DOCUMENTS

CN 101107849 1/2008
EP 2073552 A1 * 6/2009 ....... H04N 21/23406

(Continued)

OTHER PUBLICATIONS

Bagwell, Chris, SoX, http://sox.sourceforge.net/sox.html, Apr. 22, 2020.

(Continued)

*Primary Examiner* — Oyesola C Ojo
(74) *Attorney, Agent, or Firm* — Colby Nipper PLLC

(57) ABSTRACT

The present disclosure provides systems and methods for adjusting the playback speed of accessories based on the buffer level of the received content. The accessories may receive content from a host device at a certain speed. The incoming speed of the content may be different than the playback speed of the content. Therefore, a buffer level of the received content may be determined using a linear least square ("LLS") fit of the buffer level, the average of the buffer level, or a phased locked loop ("PLL") approach. Based on a difference between the buffer level and the playback speed, a speed adjustment may be determined. Instructions may be transmitted from a primary accessory to a secondary accessory to adjust the playback speed by a certain amount at a certain time. This may ensure that the accessories remain in sync. The accessories may then adjust their respective playback speeds.

20 Claims, 3 Drawing Sheets

(56) References Cited

U.S. PATENT DOCUMENTS

| | | | |
|---|---|---|---|
| 8,891,946 B2* | 11/2014 | Chen | H04L 65/80 |
| | | | 386/345 |
| 9,614,977 B1* | 4/2017 | Bond | H04M 11/066 |
| 2002/0101368 A1* | 8/2002 | Choi | G10L 21/04 |
| | | | 704/E21.017 |
| 2005/0100323 A1* | 5/2005 | Miyashita | H04N 5/783 |
| | | | 386/E5.052 |
| 2006/0104397 A1* | 5/2006 | Lottis | H04N 21/4392 |
| | | | 375/372 |
| 2006/0149850 A1* | 7/2006 | Bowman | G11B 27/10 |
| | | | 709/205 |
| 2007/0223873 A1* | 9/2007 | Gilbert | H04N 7/163 |
| | | | 386/E5.052 |
| 2008/0226094 A1 | 9/2008 | Rutschman | |
| 2012/0054383 A1* | 3/2012 | Lindahl | G06F 1/324 |
| | | | 710/57 |
| 2012/0230510 A1* | 9/2012 | Dinescu | H04R 5/033 |
| | | | 381/80 |
| 2013/0148940 A1* | 6/2013 | Schmit | H04N 5/783 |
| | | | 386/E5.052 |
| 2013/0266152 A1 | 10/2013 | Haynie et al. | |
| 2014/0029701 A1* | 1/2014 | Newham | H04J 3/0652 |
| | | | 704/E21.001 |
| 2014/0338516 A1* | 11/2014 | Andri | G10H 1/40 |
| | | | 84/612 |
| 2015/0033277 A1* | 1/2015 | Li | H04N 21/438 |
| | | | 725/116 |
| 2015/0189092 A1 | 7/2015 | Thapa et al. | |
| 2015/0208106 A1* | 7/2015 | Bieger | H04N 21/2401 |
| | | | 725/75 |
| 2016/0142988 A1 | 5/2016 | Powell et al. | |
| 2018/0020384 A1* | 1/2018 | Sleight | H04L 65/61 |
| 2018/0069909 A1* | 3/2018 | Suri | H04L 65/70 |
| 2018/0077443 A1* | 3/2018 | Lau | H04N 21/2625 |
| 2020/0322649 A1* | 10/2020 | Melkote Krishnaprasad | |
| | | | H04N 21/439 |
| 2021/0224028 A1* | 7/2021 | Kim | G06F 3/162 |

FOREIGN PATENT DOCUMENTS

| | | | |
|---|---|---|---|
| EP | 2073552 A1 | 6/2009 | |
| JP | 2006287422 | 10/2006 | |
| WO | 2006011867 | 2/2006 | |
| WO | WO-2013151878 A1 * | 10/2013 | H04R 5/033 |
| WO | WO-2014032913 A1 * | 3/2014 | H04H 20/22 |
| WO | 2021145659 | 7/2021 | |

OTHER PUBLICATIONS

International Search Report and Written Opinion for International Application No. PCT/US2020/043043 dated Dec. 22, 2020. 13 pages.

"Foreign Office Action", EP Application No. 20754094.9, dated Mar. 15, 2023, 5 pages.

"International Preliminary Report on Patentability", Application No. PCT/US2020/043043, dated Jan. 24, 2023, 8 pages.

"Extended European Search Report", EP Application No. 23206198.6, dated Nov. 8, 2023, 11 pages.

"Foreign Office Action", CN Application No. 202080008519.8, dated Oct. 12, 2023, 31 pages.

* cited by examiner

BLUETOOTH EARPHONE ADAPTIVE AUDIO PLAYBACK SPEED

CROSS-REFERENCE TO RELATED APPLICATIONS

The present application is a national phase entry under 35 U.S.C. § 371 of International Application No. PCT/US2020/043043, filed Jul. 22, 2020, the entire disclosure of which is incorporated herein by reference.

BACKGROUND

A host device, such as a smartphone, may transmit content to an accessory via a wireless communication interface. The accessory may receive the content at a certain speed. The accessory may buffer the content such that a given level of content is buffered within a buffer in the memory of the accessory. The accessory may then output the content to a user at a certain playback speed. The rate at which the content is received may be different than the playback speed. This may cause delays or interruptions in the playback of content, such as when the playback speed is faster than the rate at which the content is received. This may cause pauses or breaks in the output of content to the user as the buffer level may be below a threshold due to the difference in playback speed and the speed at which the content is received. Such a break or pause in the output of content may be frustrating or inconvenient to a user. Delays or interruptions in the playback of content may also occur when buffers in the host device and accessory start to fill up. This may cause a delay between when the host device queues the content and when the content plays. This may also lead to unsynchronized content, such as when the content is audio and video content. When buffers get too full, data may be dropped and there may be a discontinuity in the audio stream which may lead to an unpleasant listening experience as it may not play part of the content.

When the accessory is a pair of earbuds, one earbud may have a playback speed that is faster than the playback speed of the other earbud. The difference in playback speed may result in an audible difference in the content being output in one earbud as compared to the other. This may be frustrating to the user.

BRIEF SUMMARY

The present disclosure provides a framework for adjusting the playback speed of content by an accessory based on a buffer level of the content. One aspect of the disclosure includes an accessory comprising a memory and one or more processing devices coupled to the memory, wherein the one or more processors are configured to receive content, determine, a buffer level of the received content within a buffer in the memory, determine, based on the buffer level of the received content, a speed adjustment, transmit, to a second accessory, instructions to adjust a playback speed of the content based on the speed adjustment at an adjustment time, and adjust, at the adjustment time, the playback speed of the content based on the speed adjustment.

The speed adjustment may be a difference between the playback speed of the content and a speed at which the content is received. Determining the buffer level may further include determining a slope of the buffer level over a predetermined period of time. The slope may be determined using a linear least square ("LLS") fit. The slope may be determined using an average of a first buffer level at a first time and a second buffer level at a second time, the first time being different than the second time.

The one or more processing devices may be further configured to compare the buffer level to a minimum threshold and a maximum threshold. When the buffer level is less than the minimum threshold, the one or more processors may be further configured to decrease the playback speed of the content. When the buffer level is greater than the maximum threshold, the one or more processors may be further configured to increase the playback speed of the content.

The one or more processing devices may be further configured to receive, from the second accessory, an acknowledgement of the request. When the one or more processors receive the acknowledgment of the request, the accessory may adjust the playback speed at the adjustment time. When the one or more processors does not receive the acknowledgement of the request, the accessory may not adjust the playback speed at the adjustment time.

The accessory may further comprise a communications device configured to transmit the instructions to the second accessory and receive, from the second accessory, an acknowledgement that the second accessory received the instructions.

Another aspect of the disclosure includes a system comprising a first accessory, including a first communications interface, a first a first memory, and one or more first processors coupled to the first memory and a second accessory, including a second communications interface, a second memory, and one or more second processors coupled to the second memory. The one or more first processors of the first accessory may be configured to receive content, determine a buffer level of the received content within a buffer in the first memory, determine, based on the buffer level of the received content, a speed adjustment, transmit, using the first communications interface, instructions to adjust the playback speed of the content based on the speed adjustment at an adjustment time, and adjust, at the adjustment time, the playback speed of the content based on the speed adjustment. The one or more second processors of the second accessory may be configured to receive the content, receive, via the second communications interface, the request from the first accessory, and adjust, at the adjustment time, the playback speed of the content based on the speed adjustment.

Yet another aspect of the disclosure include a method comprising receiving, by one or more processors, content, determining, by the one or more processors, a buffer level of the received content within a buffer in a memory, determining, by the one or more processors based on the buffer level of the received content, a speed adjustment, transmitting, by the one or more processors, instructions to adjust a playback speed of the content based on the speed adjustment at an adjustment time, and adjusting, by the one or more processors at the adjustment time, the playback speed of the content based on the speed adjustment.

DETAILED DESCRIPTION

An accessory may receive content from a host device, or another accessory. Accessories may be any device that is capable of receiving content, such as earbuds, smart glasses, AR/VR headsets, helmets, etc. The content may be received at a certain rate or speed, such as the speed at which the host device transmits the content to the accessory. The accessory may determine a buffer level of the received content in a buffer within a memory of the accessory. In examples where there is a difference between a predetermined target buffer level of the received content and the actual buffer level of the content, the device may determine a speed adjustment. The speed adjustment may increase or decrease the playback speed of the content being output by the accessory to match or be substantially similar to the incoming speed. The increase or decrease in playback speed may be proportional to the difference between the target buffer level and the actual buffer level.

A primary accessory may send a request to a secondary accessory. The request may include the speed adjustment and an adjustment time. The adjustment time may be a predetermined time in the future after the request is sent. The adjustment time may allow the primary and secondary accessory to adjust the playback speed of the content at the same time. This may ensure that the primary and secondary accessory output content at the same playback speed. Outputting content at the same playback speed may increase the quality of the user experience. Users may detect differences in playback speeds between the primary and secondary accessory if the playback speed is out of sync or off by approximately 50 microseconds. When the primary and secondary accessory are out of sync, this may be irritating, bothersome, and/or frustrating to the user. Adjusting the playback speed at the same time may alleviate this issue.

Figure 1A:
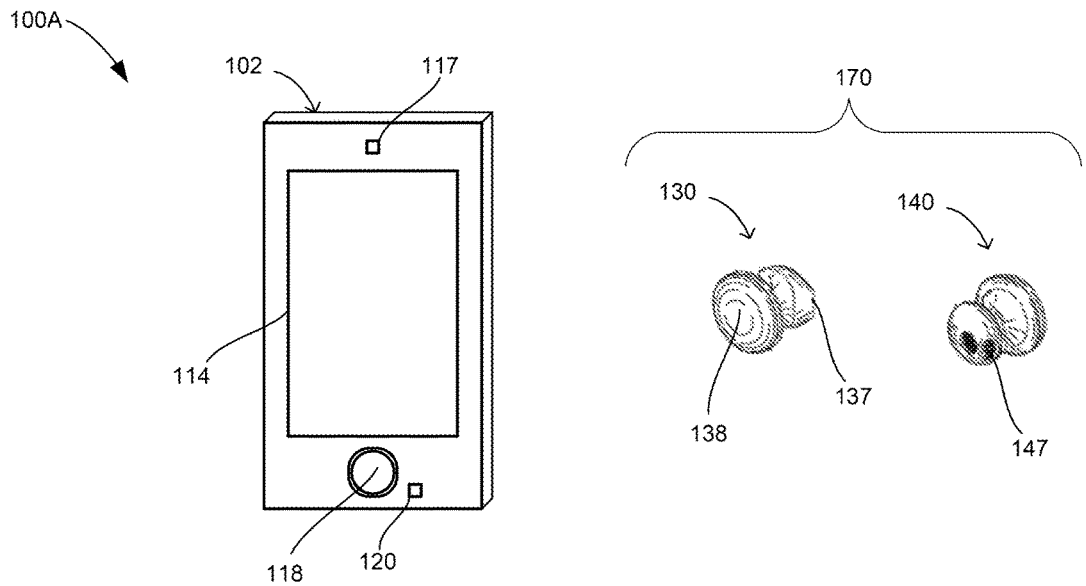
FIG. 1A is a functional diagram of an example system according to aspects of the disclosure.

According to some examples, the accessory may be a pair of earbuds. In such an example, one earbud may be a primary earbud and the other earbud may be a secondary earbud. The primary earbud may transmit the request to the secondary earbud. In some examples, the secondary earbud may transmit an acknowledgement to the primary earbud. The acknowledgement may be a form of verification to ensure that the primary and secondary earbuds will adjust the playback speed at the same time FIG. 1A illustrates an example system 100A in which the features described herein may be implemented. It should not be considered limiting the scope of the disclosure or usefulness of the features described herein. In this example, system 100A may include a host device 102 and an accessory 170. The host device 102 may be a smartphone and accessory 170 may be a pair of earbuds 130, 140. The host device 102 and/or accessory 170 may be any device or accessory, such as a mobile phones, wireless-enabled PDAs, tablet PC, a netbook that is capable of obtaining information via the Internet or other networks, wearable computing devices (e.g., a smartwatch, headset, smartglasses, virtual reality player, other head-mounted display, etc.), wireless speakers, home assistants, gaming consoles, etc.

Smartphone 102 and/or earbuds 130, 140 may be a personal computing device intended for use having some or all of the components normally used in connection with a personal computing device, as described herein, including a one or more processors (e.g., a central processing unit (CPU)), memory (e.g., RAM and internal hard drives) storing data and instructions, a display 114 (e.g., a monitor having a screen, a touch-screen, a projector, a television, or other devices such as a smartwatch display that is operable to display information), an output (e.g. speakers 117, 137, 147), and user input devices (e.g., touchpad 118, 138, keyboard, touchscreen or microphone 120).

Figure 1B:
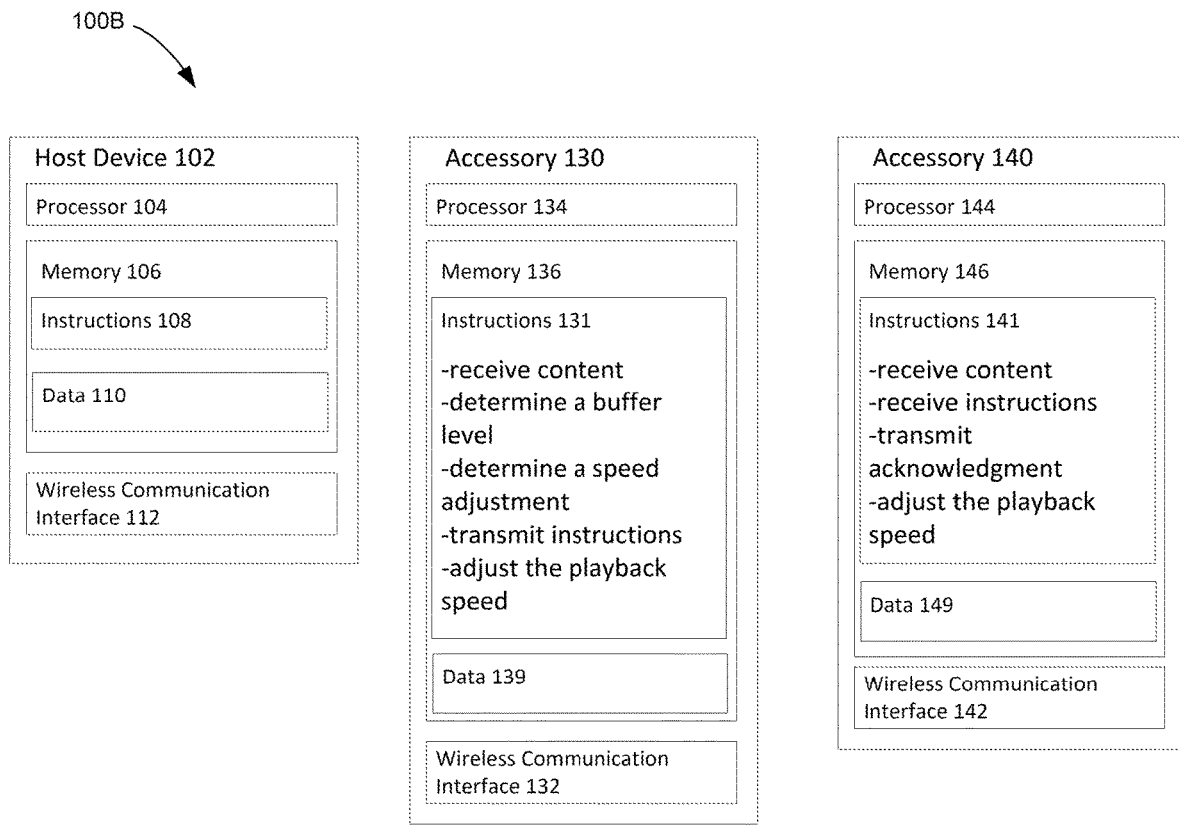
FIG. 1B is a functional block diagram of an example system in accordance with aspects of the disclosure.

FIG. 1B illustrates an example system 100B in which the features described above and herein may be implemented. In this example, system 100B may include host device 102 and accessories 130, 140. Host device 102 may contain one or more processors 104, memory 106, instructions 108, data 110, a wireless communication interface or antenna 112. The host device 102 may be able to communicate with accessories 130, 140 via a wireless communication interface.

The one or more processors 104 may be any conventional processors, such as commercially available microprocessors. Alternatively, the one or more processors may be a dedicated device such as an application specific integrated circuit (ASIC) or other hardware-based processor. Although FIG. 1B functionally illustrates the processor, memory, and other elements of host device 102 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of host device 102. Accordingly, references to a processor or computing device will be understood to include references to a collection of processors or computing devices or memories that may or may not operate in parallel.

Memory 106 may store information that is accessible by the processors, including instructions 108 that may be executed by the processors 104, and data 110. The memory 106 may be a type of memory operative to store information accessible by the processors 104, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 108 and data 110 are stored on different types of media.

Memory 106 may be retrieved, stored or modified by processors 104 in accordance with the instructions 108. For instance, although the present disclosure is not limited by a particular data structure, the data 110 may be stored in computer registers, in a relational database as a table having a plurality of different fields and records, XML documents, or flat files. The data 108 may also be formatted in a computer-readable format such as, but not limited to, binary values, ASCII or Unicode. By further way of example only, the data 110 may be stored as bitmaps comprised of pixels that are stored in compressed or uncompressed, or various image formats (e.g., JPEG), vector-based formats (e.g., SVG) or computer instructions for drawing graphics. Moreover, the data 110 may comprise information sufficient to identify the relevant information, such as numbers, descriptive text, proprietary codes, pointers, references to data stored in other memories (including other network locations) or information that is used by a function to calculate the relevant data.

The instructions 108 can be any set of instructions to be executed directly, such as machine code, or indirectly, such as scripts, by the processor 104. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The host device 102 may further include a wireless communication interface 112, such as an antenna, transceiver, and any other devices used for wireless communication. The antenna may be, for example, a short-range wireless network antenna. The host device 102 may be able to be coupled with accessories 130, 140 via a wireless connection. For instance, the wireless communication interface 112 may be used to transmit and receive Bluetooth signals. There may be a maximum distance between host device 102 and accessories 130, 140 that would allow host device 102 and accessories 130, 140 to be within range of each other.

Accessories 130, 140 may each include one or more processors 134, 144, memory 136, 146, instructions 131, 141, data 139, 149, and wireless communication interface 132, 142 that are substantially similar to those described herein with respect to host device 102.

Figure 2A:
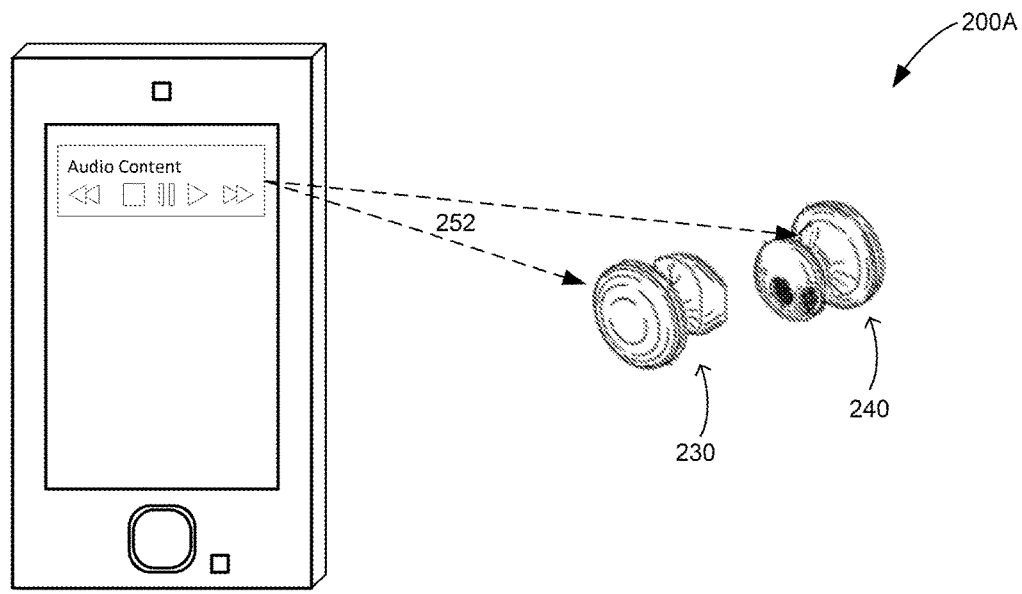
FIG. 2A is a pictorial diagram of illustrating an example use of the system according to aspects of the disclosure.

FIG. 2A illustrates a system 200A in which the host device 202 may be capable of receiving and/or transmitting content to accessories 230, 240. Accessories 230, 240 may be able to receive and/or transmit content to each other. For example, host device 202 may be streaming audio content 250. The audio content 250 may be, for example, music or audio associated with a video being streamed on host device 202. Host device 202 may transmit 252 the music content to accessories 230, 240 for output to a user.

According to some examples, the host device 202 may be a smartphone and the accessories 230, 240 may be a pair of earbuds. One earbud 230 may be the primary earbud and the other earbud 240 may be the secondary earbud.

Figure 2B:
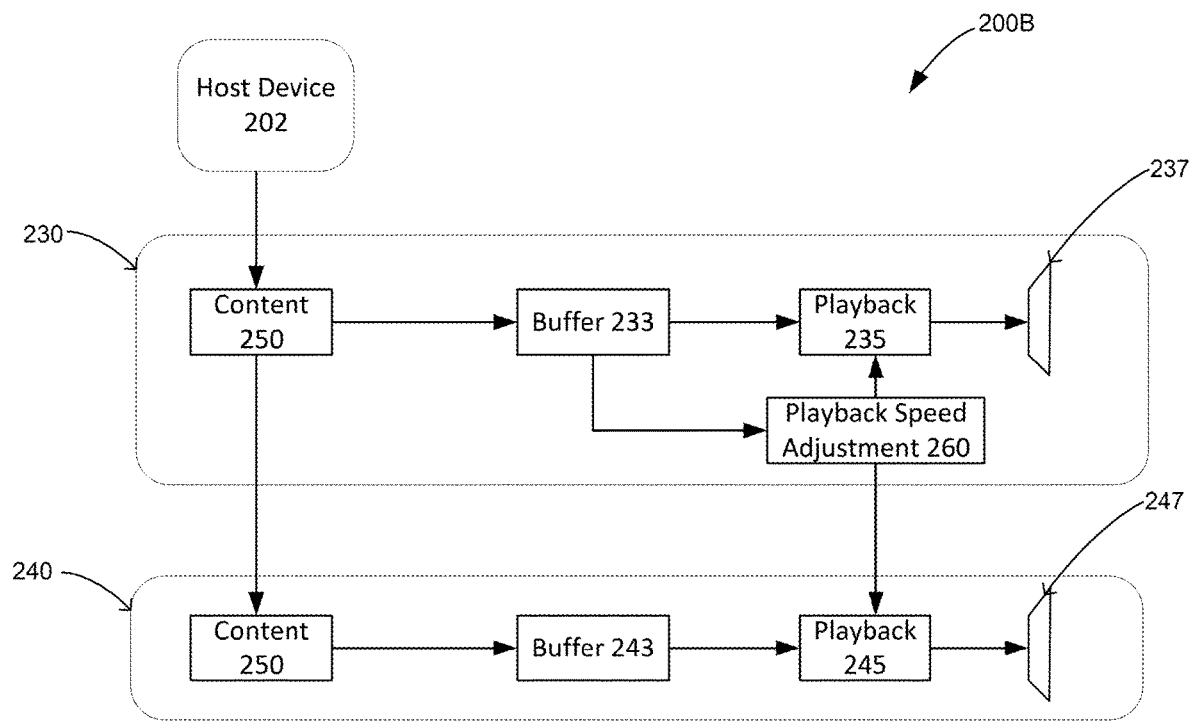
FIG. 2B is a functional block diagram illustrating an example use of the system according to aspects of the disclosure.

FIG. 2B illustrates a system 200B in which the playback speed of content output by the accessories may be adjusted. System 200B may include a host device 202, primary accessory 230, and secondary accessory 240. For example, the primary accessory 230 may be one earbud of the pair of earbuds and the secondary accessory 240 may be the other earbud of the pair of earbuds. The accessories may include a buffer 233, 243, a playback module 235, 245, and an output 237, 247. The buffer 233, 243 may be within the memory 136, 146 of accessories 230, 240. The primary accessory 230 may also include a playback speed adjustment module 260.

The host device 202 may transmit content 250 to the primary and secondary earbuds 230, 240. Content 250 may be in the form of Advanced Audio Distribution Profile ("A2DP") packets. A2DP packets may be transmitted by host device 202 when connected to accessories 230, 240 via wireless connection interfaces. The host device 202 may transmit content 250 at a certain speed such that the accessories 230, 240 receive content at a certain speed. According to some examples, the speed at which the accessories 230, 240 receive content, or the incoming speed of the content, may be the data rate or a data transfer rate. For example, the incoming speed of the content may be the rate at which data, or content, may be transmitted across a medium. Additionally or alternatively, the incoming speed of the content may be the rate at which the buffers 233, 243 of the accessories 230, 240 are filled. The incoming speed of the content 250 received by the accessories 230, 240 may be different than the playback speed or output speed of the content 250 by the accessories 230, 240. According to some examples, the playback speed may be the rate at which buffers 233, 243 of the accessories 230, 240 are emptied. The buffers 233, 243 may be emptied by outputting content via one or more outputs.

The buffer 233, 243 may pre-process content 250 before the content 250 is output to the user. The buffer 233, 243 may be a pulse-code modulation ("PCM") buffer. According to some examples, the host device 202 may transmit content 250 to accessories 230, 240 but accessories 230, 240 may not begin outputting the content to the user until the buffer 233, 243 reaches a predetermined level, or threshold, to account for the speed at which the host device 202 transmits the content 250. According to some examples, when the incoming speed of the content 250 is slower than the playback speed of the content 250, the content in the buffer level, or the buffer level, may run out. The user may then experience a pause or stop in the content 250 being output, which may be frustrating or unpleasant. Additionally or alternatively, when the incoming speed of the content 250 to accessories 230, 240 is faster than the playback speed of the content 250, the buffer may not have enough space to store the content 250 until it is output by accessories 230, 240. In such an example, the accessories 230, 240 may experience an audio glitch. This, too, may be frustrating or unpleasant to the user.

To prevent or mitigate any audio glitches or frustrating experiences, accessories 230, 240 may determine a buffer level of the received content 250 within buffer 233, 243 in the memory of the accessories 230, 240. Determining the buffer level may include determining the slope of the buffer level over a predetermined period of time. For example, the slope of the buffer level may be determined based on the buffer level over a period of fractions of a second, seconds, minutes, etc. In some examples, the predetermined period of time may be in the last 0.5 seconds, 1 seconds, 1.6 seconds, 3 seconds, 10 seconds, 1 minute, 3 minutes, etc. Thus, the predetermined period of time may be any period of time. In some examples, the buffer level may be determined based on the buffer level. The buffer level of the received content 250 may be determined using a linear least square ("LLS") fit of the buffer level, the average of the buffer level, or a phased locked loop ("PLL") approach, etc.

Determining the buffer level using a LLS fit may use all the buffer levels observed during a predetermined period of time to estimate the slope. For example, the buffer level may be sampled at a certain frequency during the predetermined period of time. In some examples, to increase the efficiency of the processors and reduce the memory requirements, the buffer level sampling frequency may be reduced. Additionally or alternatively, the memory may store fewer samplings of the buffer level. For example, the memory may store averaged buffer levels which may be calculated every "n" seconds, where "n" represents a given value. In some examples, the buffer level may be the maximum buffer level value that occurs every "n" seconds. This may be high watermark filtering.

Using an LLS fit, the difference between the incoming speed of the content 250 and the playback speed may be determined. According to some examples, the LLS fit may be to minimize the sum of the square error or the maximum error between the buffer level and the fit line, or the slope of the buffer level. The buffer level over time may represent the speed difference between the incoming speed and the playback speed. This difference may be represented by a straight line. In examples where the buffer level over time is not a straight line, an audio event may have occurred during the predetermined period. For example, the host device or accessory may have paused or stopped the content from playing, there may have been a bad or faulty wireless connection between the host device and the accessory, etc. Using an LLS fit may filter out the audio events to provide a more accurate determination in the difference between the incoming speed and the playback speed of the content.

If the slope of the LLS fit is "x" parts per million ("ppm"), the playback speed may be adjusted by "x" ppm. In examples where the buffer level is already too high or too low as compared to the target, or threshold, buffer level, an additional playback speed adjustment, "y" ppm, may be added. The additional playback speed adjustment "y" ppm may bring the buffer level closer to the target buffer level.

According to some examples using a LLS fit, determining the buffer level may include collecting and averaging buffer level samples every 3 seconds. The average or maximum buffer level during that 3 second period may be stored in the memory of the accessory. The accessory may collected the buffer level samples every 3 seconds for a period of 5 minutes. The LLS fit may use a first order polynomial function, to fit the stored buffer level samples. The first order polynomial function may be:

$$y\_current = a\_est + b\_est * x\_current$$

"A_est" may be determined by:

$$a\_est = y\_ave - b\_est * x\_ave$$

"B_est" may be determined by:

$$b\_est = [sum(x\_i - x\_ave)(y\_i - y\_ave)] / [sum((x\_i - x\_ave)^2)]$$

"y_current" may be the current buffer level.
"a_est" may be the estimated polynomial function coefficient "a".
"b_est" may be the estimated polynomial function coefficient "b".
"x_current" may be the current time.
"y_ave" may be the averaged buffer level during the predetermined period of time.
"x_ave" may be the averaged time during the predetermined period of time.
"x_i" may be the time of the i-th buffer level sample.
"y_i" may be the i-th buffer level sample.

The LLS fit may be evaluated by determining a fitting error. The fitting error may be the difference, or error, between the buffer level samples and the fitting function. The fitting function may be the first order polynomial function described above. If the fitting error is small or below a predetermined threshold, the playback speed may be adjusted by a certain amount. The adjustment may be the sum of "b_est"+"c". "c" may be determined by:

$$c = (y\_target - y\_current) / T$$

"y_target" may be the predetermined target, or threshold, buffer level.

T may be the predetermined period of time. Based on this example, T may be 5 minutes.

If the fitting error is large or above a predetermined threshold, the playback speed may not be adjusted for this predetermined prior. The fitting error may be large due to be an audio event interrupting the incoming speed and/or playback speed. The audio event may be, for example, a bad received signal strength indication ("RSSI"), a pause or stop in the content, etc.

This process may continue to repeat itself for each predetermined period of time.

Determining the buffer level using an average of the buffer levels may include using the buffer levels at a certain number of times during the predetermined period. For example, the buffer level may be sampled at a given frequency during the predetermined period of time. The sampled buffered levels may be used to determine the average buffer level during that predetermined period of time.

According to some examples, determining the buffer level using a PPL approach may include comparing the buffer level to a target buffer level. For example, the averaged buffer level or maximum buffer level every "n" seconds may be compared to the target buffer level. If there is a difference, a playback speed adjustment may be needed to correct the difference. The adjustment to the playback speed may be proportional to the difference between the buffer level and the target level.

Additionally or alternatively, determining the buffer level using a PLL approach may include comparing the buffer level to a minimum threshold and/or a maximum threshold. When the buffer level is higher than the maximum threshold, the difference between the buffer level and the maximum threshold may be used to calculate the direction and the amount of the playback speed adjustment. In examples when the buffer level is greater than the maximum threshold, the playback speed may increase. When the buffer level is lower or less than the minimum threshold, the difference between the buffer level and the minimum threshold may be used to calculate the direction and the amount of the playback speed adjustment. In some examples, when the buffer level is less than the minimum threshold, the playback speed may be decreased. In either or both examples, the adjustment to the playback speed may be proportional to the difference between the buffer level and the minimum and/or maximum threshold.

When primary accessory 230 determines that the buffer level of the received content 250 is too high or too low as compared to a predetermined threshold, the playback speed adjustment module 260 may determine a speed adjustment. As described above, the speed adjustment amount may be based on a LLS fit or a PPL approach.

The primary accessory 230 may transmit instructions to the secondary accessory 240 based on the speed adjustment determined by the playback speed adjustment module 260. The instructions may include the speed adjustment and an adjustment time. The adjustment time may be a time in the future. For example, the adjustment time may be "n" seconds from the time the instructions are transmitted from the primary accessory 230 to the secondary accessory 240. In some examples, the adjustment time may be a certain time based on a shared clock between the primary accessory 230 and secondary accessory 240. In such an example, the adjustment time may be 11:09a.m., 1:42p.m., etc.

When the playback speed of the primary accessory 230 and secondary accessory 240 are out of sync by 50 microseconds or more, the difference may be perceptible by a user. By adjusting the playback speed of the primary accessory 230 and secondary accessory 240 at the same time, this may ensure that the playback speeds of the primary accessory 230 and secondary accessory 240 are in sync. Moreover, as the primary accessory 230 and secondary accessory 240 are independent of each other, it may be necessary to include an adjustment time in the instructions to ensure that the playback speeds are in sync.

The primary accessory 230 may receive an acknowledgement that the secondary accessory 240 received the instructions. In examples where the primary accessory 230 receives an acknowledgment of the instructions, the primary accessory 230 and secondary accessory 240 may adjust the playback speed of content 250 at playback modules 235, 245, respectively. Thus, content 250 may be output via outputs 237, 247 at the adjusted playback speed.

In examples where the primary accessory 230 does not receive an acknowledgement of the instructions from the secondary accessory 240, the primary accessory 230 and secondary accessory 240 may not adjust the playback speed. Content 250 may continue to be output by the primary accessory 230 and secondary accessory 240 via outputs 237, 247 without adjusting the playback speed.

According to some examples, primary accessory 230 and secondary accessory 240 may receive content 250 from host device 202. Buffer 233, 243 may meet a threshold buffer level. For example, the incoming speed of the content 250 may be equal or substantially equal to the playback speed of accessories 230, 240. Thus, a playback speed adjustment may not be necessary. In such an example, the content would be output via outputs 237, 247 to the user.

Figure 3:
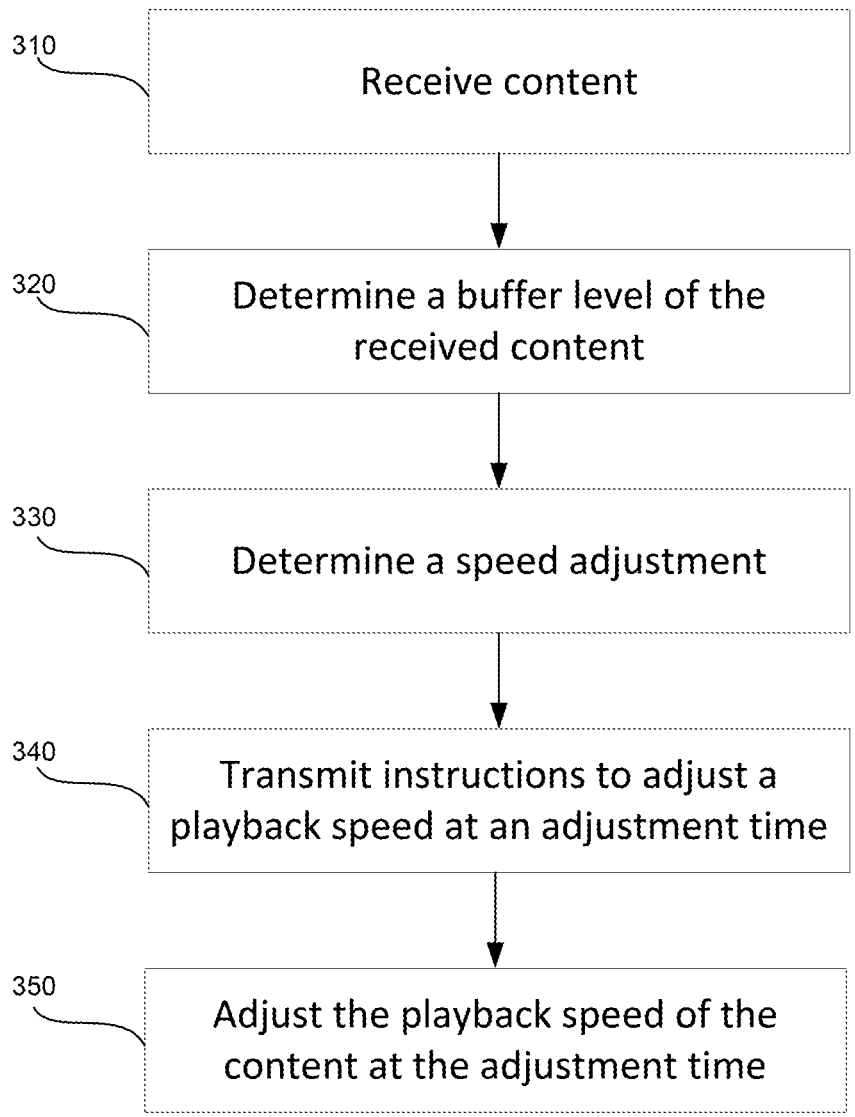
FIG. 3 is a flow diagram illustrating a method of adjusting the playback speed of an accessory according to aspects of the disclosure.

FIG. 3 illustrates an example method of adjusting the playback speed of one or more accessories. The following operations do not have to be performed in the precise order described below. Rather, various operations can be handled in a different order or simultaneously, and operations may be added or omitted. Additionally or alternatively the method may be performed on the on the device. In some examples, a portion of the method may be performed by the primary accessory and a portion of the method may be performed on the secondary accessory.

For example, in block 310 a primary accessory may receive content. The content may be content transmitted from a host device. The content may have an incoming speed. The incoming speed may be the speed at which the content is received from the host device.

In block 320, a buffer level of the received content with a buffer in the memory may be determined. Determining the buffer level may include determining a slope of the buffer level over a predetermined period of time. According to some examples, the slope is determined using a LLS fit. In some examples, the slope is determined using an average of a buffer level at a first time and a second buffer level at a second time, the first time being different from the second time. In yet another example, the buffer level may be determined using a PLL approach.

In block 330, a speed adjustment may be determined based on the buffer level. For example, the buffer level may be compared to a threshold buffer level. If the buffer level is less than the threshold buffer level, the playback speed may be decreased. If the buffer level is greater than the threshold buffer level, the playback speed may be increased. The playback speed adjustment, or the increase and/or decrease in the playback speed, may be proportional to the difference between the buffer level and the threshold level.

The primary accessory and secondary accessory may include a wireless communications interface that allows the primary accessory and secondary accessory to receive content from the host device and also communicate between each of the primary and second accessories. In block 340, the primary accessory may transmit instructions to a secondary accessory to adjust the playback speed at an adjustment time. The instructions may include the amount to adjust the playback speed and the time to adjust the playback speed. According to some examples, the primary accessory may receive an acknowledgement from the secondary accessory.

In block 350, the primary accessory may adjust the playback speed of the content at the adjustment time. In some examples, the primary accessory may only adjust the playback speed of the content if the primary accessory receives the acknowledgment from the secondary accessory. In such an example, the primary accessory and secondary accessory may adjust the playback speed of the content at the adjustment time. In some examples, if the primary accessory does not receive an acknowledgement from the secondary accessory, the primary accessory may not adjust the playback speed.

After the playback speed is adjusted or not adjusted, the process may start over.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An accessory, comprising:
a memory; and
one or more processing devices coupled to the memory, wherein the one or more processors are configured to:
receive content;
determine a buffer level of the received content within a buffer in the memory;
determine a difference between a playback speed of the content and a speed at which the content is received;
determine an error in the determined difference;
determine, based on the determined difference, the determined error in the determined difference, and the buffer level of the received content, a speed adjustment;
transmit, to a second accessory, instructions to adjust the playback speed of the content based on the speed adjustment at an adjustment time; and
adjust, at the adjustment time, the playback speed of the content based on the speed adjustment.

2. The accessory of claim 1, wherein determining the difference between the playback speed of the content and the speed at which the content is received further includes determining a slope of the buffer level over a predetermined period of time.

3. The accessory of claim 2, wherein the slope is determined using a linear least square ("LLS") fit.

4. The accessory of claim 2, wherein the slope is determined using an average of a first buffer level at a first time and a second buffer level at a second time, the first time being different than the second time.

5. The accessory of claim 1, wherein the one or more processing devices are further configured to compare the buffer level to a minimum threshold and a maximum threshold,
   wherein when the buffer level is less than the minimum threshold, the one or more processors are further configured to decrease the playback speed of the content, and
   wherein when the buffer level is greater than the maximum threshold, the one or more processors are further configured to increase the playback speed of the content.

6. The accessory of claim 1, wherein the one or more processing devices are further configured to receive, from the second accessory, an acknowledgment of the request,
   wherein when the one or more processors receive the acknowledgment of the request, the accessory adjusts the playback speed at the adjustment time, and
   wherein when the one or more processors does not receive the acknowledge of the request, the accessory does not adjust the playback speed at the adjustment time.

7. The accessory of claim 1, further comprising a communication device configured to:
   transmit the instructions to the second accessory, and
   receive, from the second accessory, an acknowledgement that the second accessory received the instructions.

8. A system, comprising:
   a first accessory, including a first communications interface, a first a first memory, and one or more first processors coupled to the first memory;
   a second accessory, including a second communications interface, a second memory, and one or more second processors coupled to the second memory;
   wherein the one or more first processors of the first accessory are configured to:
      receive content;
      determine a buffer level of the received content within a buffer in the first memory;
      determine a difference between a playback speed of the content and a speed at which the content is received;
      determine an error in the determined difference;
      determine, based on the determined difference, the determined error in the determined difference, and the buffer level of the received content, a speed adjustment;
      transmit, using the first communications interface, instructions to adjust the playback speed of the content based on the speed adjustment at an adjustment time;
      adjust, at the adjustment time, the playback speed of the content based on the speed adjustment; and
   wherein the one or more second processors of the second accessory are configured to:
      receive the content;
      receive, via the second communications interface, the request from the first accessory; and
      adjust, at the adjustment time, the playback speed of the content based on the speed adjustment.

9. The system of claim 8, wherein determining the difference between the playback speed of the content and the speed at which the content is received further includes determining a slope of the buffer level over a predetermined period of time.

10. The system of claim 9, wherein the slope is determined using a linear least square ("LLS") fit.

11. The system of claim 9, wherein the slope is determined using an average of a first buffer level at a first time and a second buffer level at a second time, the first time being different than the second time.

12. The system of claim 8, wherein the one or more processors are further configured to compare the buffer level to a minimum threshold and a maximum threshold,
   wherein when the buffer level is less than the minimum threshold, the one or more processors are further configured to decrease the playback speed of the content, and
   wherein when the buffer level is greater than the maximum threshold, the one or more processors are further configured to increase the playback speed of the content.

13. The system of claim 8,
   wherein the one or more second processors are further configured to transmit, via the second communications interface, an acknowledgement of the instructions to the first accessory, and
   wherein the one or more first processors are further configured to receive, via the first communications interface from the second accessory, the acknowledgement of the instructions.

14. A method, comprising:
   receiving, by one or more processors, content;
   determining, by the one or more processors, a buffer level of the received content within a buffer in a memory;
   determining, by the one or more processors, a difference between a playback speed of the content and a speed at which the content is received;
   determining, by the one or more processors, an error in the determined difference;
   determining, by the one or more processors based on the determined difference, the determined error in the determined difference, and the buffer level of the received content, a speed adjustment;
   transmitting, by the one or more processors, instructions to adjust the playback speed of the content based on the speed adjustment at an adjustment time; and
   adjusting, by the one or more processors at the adjustment time, the playback speed of the content based on the speed adjustment.

15. The method of claim 14, further comprising determining, by the one or more processors, a slope of the buffer level over a predetermined prior of time.

16. The method of claim 15, wherein the slope is determined using a linear least square ("LLS") fit or an average of a first buffer level at a first time and a second buffer level at a second time, the first time being different than the second time.

17. The method of claim 14, further comprising:
   comparing, by the one or more processors, the buffer level to a minimum threshold and a maximum threshold,
   wherein when the buffer level is less than the minimum threshold, the method further comprises, decreasing, by the one or more processors, the playback speed of the content, and
   wherein when the buffer level is greater than the maximum threshold, the method further comprises increasing, by the one or more processors, the playback speed of the content.

18. The accessory of claim 1, wherein:
   the determined difference between the playback speed of the content and the speed at which the content is received is based on a fit buffer level output from a fitting function; and
   the determination of the error in the determined difference between the playback speed of the content and the speed at which the content is received is based on a difference between the buffer level and the fit buffer level.

19. The system of claim 8, wherein:

the determined difference between the playback speed of the content and the speed at which the content is received is based on a fit buffer level output from a fitting function; and the determination of the error in the determined difference between the playback speed of the content and the speed at which the content is received is based on a difference between the buffer level and the fit buffer level.

20. The method of claim 14, wherein:

the determined difference between the playback speed of the content and the speed at which the content is received is based on a fit buffer level output from a fitting function; and the determination of the error in the determined difference between the playback speed of the content and the speed at which the content is received is based on a difference between the buffer level and the fit buffer level.

\* \* \* \* \*